Oct. 25, 1955　　　W. E. SHEPPARD　　　2,721,921
WELDING APPARATUS
Filed Feb. 24, 1953
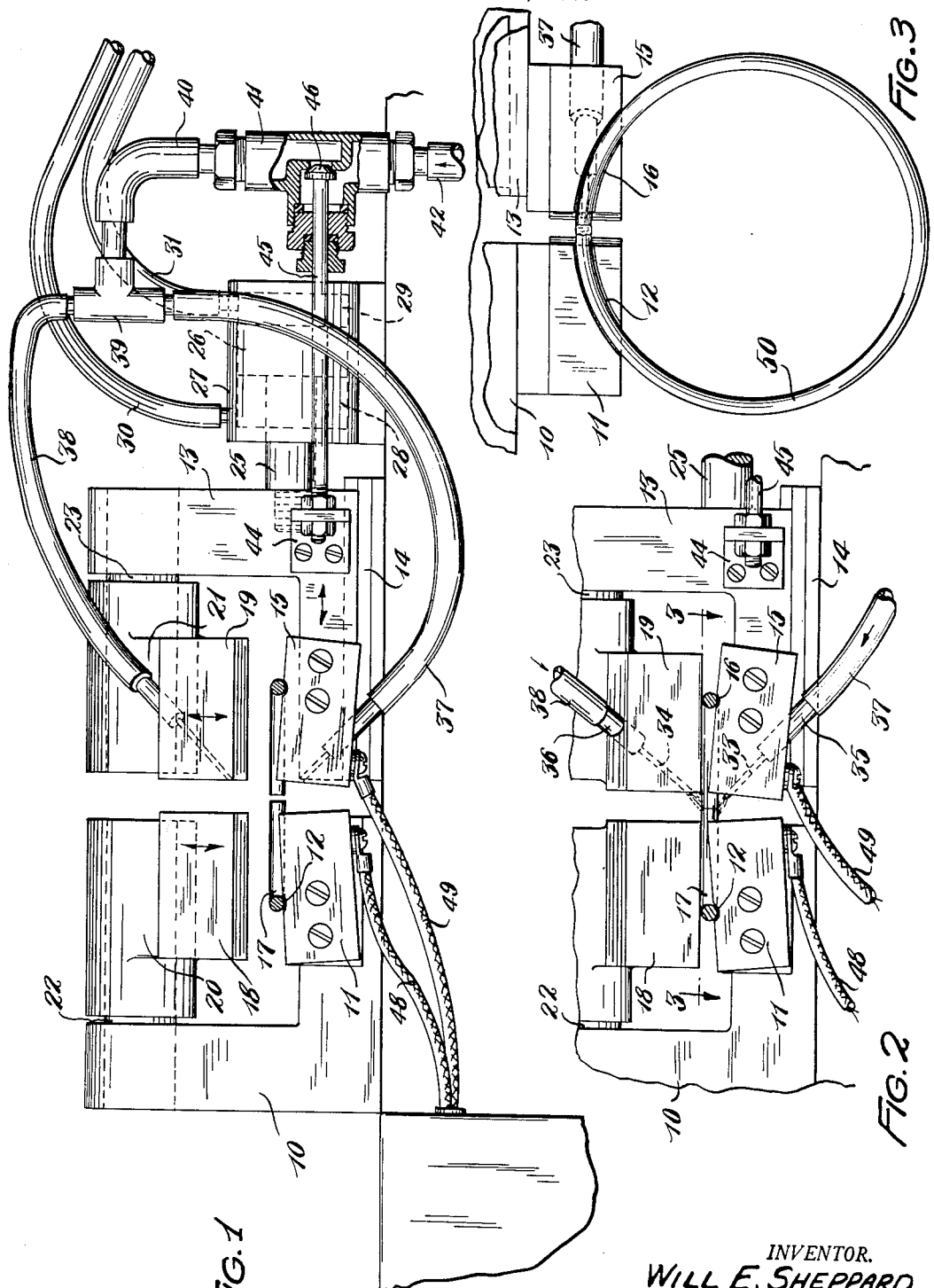
INVENTOR.
WILL E. SHEPPARD
BY Hudson, Boughton,
Williams, David & Hoffmann
ATTORNEYS

United States Patent Office 2,721,921
Patented Oct. 25, 1955

2,721,921
WELDING APPARATUS

Will E. Sheppard, Shaker Heights, Ohio, assignor to Cleveland Precision Ring & Products Co., Cleveland, Ohio, a corporation of Ohio Application February 24, 1953, Serial No. 338,208

2 Claims. (Cl. 219—4)

This invention relates to a welding method and means for joining abutting wire ends with a burr free weld. The invention is illustrated herein as applied to a method and means for completing the formation of a wire ring by welding together the ends of a previously formed wire split ring.

One of the objects of the invention is the provision of a method and means for making a burr free joint in order that in the production of a smooth surfaced joint there may be eliminated the step of grinding off the flash which results from the conventional welding operation.

Another object of the invention is the provision of a welding machine embodying means for carrying out the invention by including passages in the work gripping jaws of the machine through which streams of oxygen or air may be played directly upon the wire ends simultaneously with the application of the welding current.

Other objects and features of novelty will appear as I proceed with the description of that embodiment of the invention which, for the purposes of the present application, I have illustrated in the accompanying drawing, in which Fig. 1 is a diagrammatic elevational view of a portion of a welding machine equipped with means for carrying out the invention, the parts being shown with the clamping jaws in the open condition and a split ring in position to be clamped and welded.

Fig. 2 is a similar fragmental elevational view showing the ring clamped between the gripping jaws, its ends brought together into welding relation and streams of oxygen bearing gas being played upon the molten metal of the weld, and Fig. 3 is a plan view taken substantially on the line 3—3 of Fig. 2.

In the drawing a rigid part of the machine frame is shown at 10, and attached to this part is a lower clamping jaw 11 in the upper surface of which there is formed a groove 12 extending through a portion of a circle corresponding in radius with that of the ring which is to be welded.

A bracket 13 somewhat similar in form to the rigid frame part 10 is mounted to slide upon a track 14. To this bracket there is attached another lower clamping jaw 15 in the upper surface of which there is formed a groove 16 of circular contour and of the same radius as groove 12. The two grooves are designed to receive a split ring shown at 17.

If two pieces of straight wire were to be joined by the weld, the grooves formed in the jaws 11 and 15 would of course be straight and would extend in alignment lengthwise of the jaws.

Upper clamping jaws 18 and 19 are mounted on the forward ends of levers 20 and 21 which turn upon aligned trunnions 22 and 23 journalled in the fixed frame member 10 and the slidable bracket 13. When swung down simultaneously from the Fig. 1 inoperative position to the Fig. 2 operative position they press the ring against the lower clamping jaws and thereby hold it firmly.

Bracket 13 may be slid from the inoperative position of Fig. 1 to the operative position of Fig. 2 by any suitable means. As shown herein there is threadably mounted in the bracket a rod 25 on the opposite end of which there is a piston 26 which runs in a cylinder 27. On opposite sides of the piston there are closed chambers 28 and 29 to which are connected fluid conductors 30 and 31. When the bracket 13 is to be advanced to welding position live fluid is caused to enter chamber 29 and the chamber 28 is exhausted. When the weld has been made the bracket is slid to the right by connecting chamber 28 with live fluid and chamber 29 with exhaust.

In lower clamping jaw 15 a small fluid passage 33 is drilled in such a way that its inner extremity is directed toward the ring ends. A similar small passage 34 is drilled in upper jaw 19 and directed toward the ring ends. The outer extremities of these passages are counterbored to take short metal tubes 35 and 36 forming nipples to which are connected flexible hoses 37 and 38, which extend to a metal T connection 39 and thence through a metal elbow 40 to a valve housing 41. Tubular connection 42 at the opposite end of the housing extends to a source of pressure fluid containing oxygen, not shown.

A small angle iron 44 is secured to sliding bracket 13, and to one flange of this angle iron there is attached one end of a longitudinally extending rod 45 which enters valve housing 41. This rod operates a valve 46 in the valve housing, the valve being closed in the Fig. 1 position. When, however, the slide bracket 13 moves to the left to bring the wire ends into welding relation the valve 46 is opened, so that oxygen bearing gas, that is to say oxygen or air or other gas containing oxygen, is promptly blown against the wire ends. The passage 33 may be formed in either one of the lower clamping jaws 11 and 15, and the passage 34 may likewise be formed in either one of the upper jaws 18 and 19.

In order to supply a high amperage welding current, line current is led through the primary of a step-down transformer and the current from the secondary is conducted to the clamping jaws 11 and 15, as is conventional practice in machines of this kind.

In the drawing electrical conductors for this high amperage current are indicated diagrammatically at 48 and 49.

The machine is preferably fully automatic in order that rings may be welded at a rate approximately as fast as it is possible for an operator to feed them into position. However the controls may be operated by foot pedals or the like if desired. After the operator places a split ring in position as illustrated in Fig. 1, the upper jaws 18 and 19 descend and press the ring against the lower jaws 11 and 15. Then by means of the pressure fluid connections 30 and 31 and control valve, not shown, the piston 26 is moved toward the left, bringing the ring ends together as in Fig. 2. Simultaneously with this movement valve 46 is opened and streams of oxygen bearing gas are forced through the passages 33 and 34 against the wire ends which reach a welding temperature almost instantly. The metal at the joint is then molten. The pressure exerted to force the ring ends together tends to produce a flow of metal outwardly in all directions and thereby to form a flash or burr extending all around the joint. This does not occur in my method. On the contrary a smooth joint is effected without any burr, although in some instances there may be a slight bulge in the wire at the joint, somewhat as indicated in the completed ring shown in Fig. 3 at 50. It is my belief that the streams of oxygen impinging upon the molten metal of the incipient flash support combustion to the extent that excess metal is burned off, while the surface of the weld is smoothed down.

Where manual control means is employed the operator may throw a control element, as by means of a foot pedal, whereupon the machine goes through the same series of actions as in the fully automatic case, that is the gripping jaws close, the pair of jaws 15, 19 move toward the left, the electric arc between the wire ends effects the weld and the gas streams are impinged on the joint simultaneously. Then the two pairs of jaws open, the jaws 15 and 19 move toward the right, valve 46 closes and the completed ring falls down a chute, not shown.

More than two gas streams may be played upon the joint at evenly spaced positions around the weld if desired, but I have found that the arrangement illustrated in which two opposed streams are used produces highly satisfactory results.

Having thus described my invention, I claim:

1. In a machine for joining the ends of a split wire ring, two pairs of upper and lower clamping jaws, each pair being adapted to grip an end of the ring adjacent the split therein, an electric welding circuit comprising a jaw of each pair, means for moving said pairs of jaws relatively toward each other, one upper and one lower jaw having a passage therethrough directed toward the meeting ends of the ring, gas conducting means connected with said passages and with a supply of oxygen bearing gas under pressure, a valve in said conducting means, and means functioning simultaneously with the movement of said pairs of jaws toward each other for opening said valve, whereby a weld with a smooth surface is formed.

2. In a machine for joining the ends of a split wire ring, two pairs of upper and lower clamping jaws, each pair being adapted to grip an end of the ring adjacent the split therein, an electric welding circuit comprising a jaw of each pair, means for moving said pairs of jaws relatively toward each other, one upper and one lower jaw having a passage therethrough directed toward the meeting ends of the ring, conductors connected with said passages, and means actuated by the movement of said pairs of jaws toward each other for introducing gas containing oxygen into said conductors during the welding operation, whereby a weld with a smooth surface is formed.

References Cited in the file of this patent

UNITED STATES PATENTS

| | | |
|---|---|---|
| 386,088 | Ries | July 10, 1888 |
| 432,651 | Thomson | July 22, 1890 |
| 705,130 | Perry | July 22, 1902 |
| 746,442 | Bates | Dec. 8, 1903 |
| 1,746,204 | Thomson | Feb. 4, 1930 |
| 2,387,067 | Heath | Oct. 16, 1945 |
| 2,416,374 | Brunberg | Feb. 25, 1947 |
| 2,550,495 | Pilia | Apr. 24, 1951 |